Figure 1:
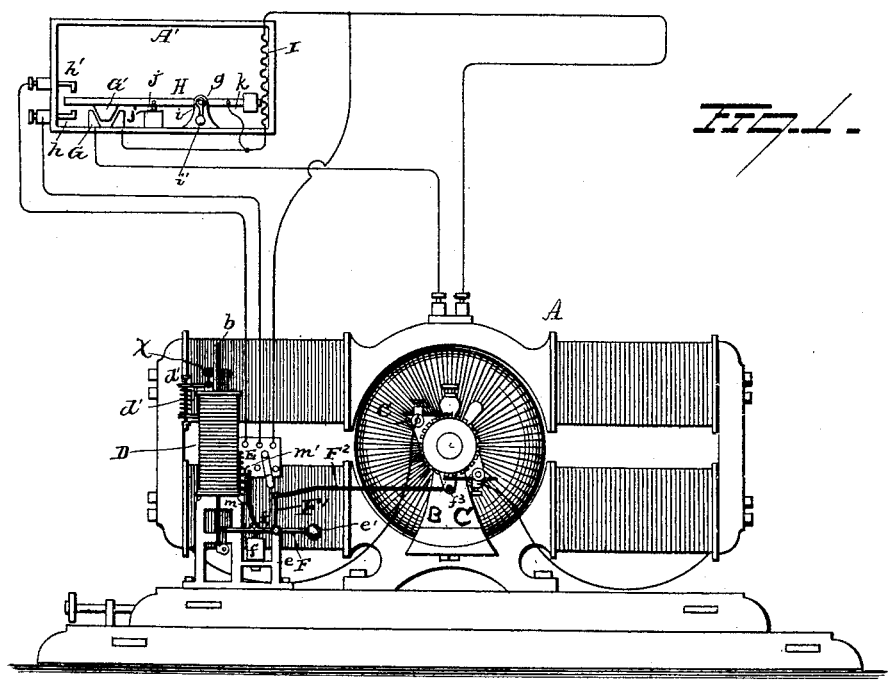

(No Model.) 2 Sheets—Sheet 1.

A. S. KROTZ.
ELECTRIC CURRENT REGULATOR.

No. 479,886. Patented Aug. 2, 1892.

Witnesses
E. J. Attingham
G. F. Downing

Inventor
A. S. Krotz
By Seggett & Seggett
Attorneys

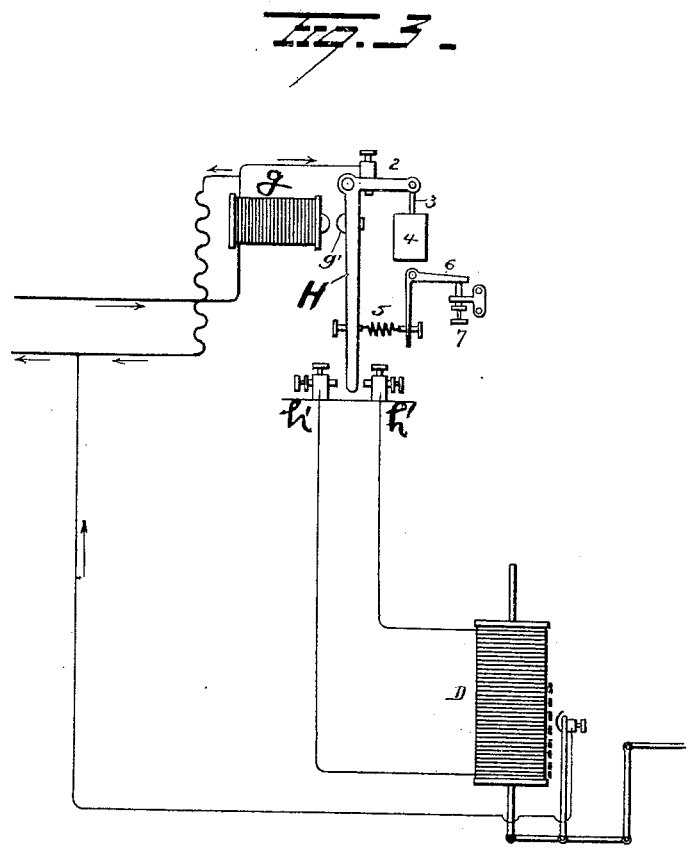

UNITED STATES PATENT OFFICE.

ALVARO S. KROTZ, OF DEFIANCE, OHIO, ASSIGNOR OF ONE-HALF TO ANDREW SAUER, OF SAME PLACE.

ELECTRIC-CURRENT REGULATOR.

SPECIFICATION forming part of Letters Patent No. 479,886, dated August 2, 1892.

Application filed March 26, 1891. Serial No. 386,546. (No model.)

*To all whom it may concern:*

Be it known that I, ALVARO S. KROTZ, a resident of Defiance, in the county of Defiance and State of Ohio, have invented certain new and useful Improvements in Electric-Current Regulators; and I do hereby declare the following to be a full, clear, and exact description of the invention, such as will enable others skilled in the art to which it appertains to make and use the same.

My invention relates to an improvement in regulators and controllers for electric generators, the object of the invention being to produce efficient means whereby the current from a dynamo electric machine may be automatically controlled and regulated.

A further object is to produce an improved current controller and regulator and to so construct and arrange the same that the output of the dynamo shall be commensurate with the load upon the same.

A further object is to construct and arrange an electric-current controller and regulator in such manner that an undue increase or decrease of the current in the main line will operate said controlling devices to regulate the output of the dynamo.

A further object is to produce electric controlling and regulating apparatus for electric generators, which shall be of simple construction, not easy to get out of order, and which shall be effectual in the performance of its functions.

With these objects in view the invention consists in the combination, with a generator and the main circuit including the same, of a shunt-circuit, a solenoid included in said shunt-circuit, devices connected with the core of said solenoid and adapted to vary the strength of the current in the main circuit, and electrically-operative devices included in the main circuit for controlling the operation of the solenoid.

The invention further consists in the combination, with a dynamo-electric machine and a main circuit including the same, of a normally-open shunt-circuit, a solenoid included in said shunt-circuit, means connecting the core of said solenoid with the commutator-brush holder of the dynamo, and an electrically-operative device included in the main circuit for automatically controlling the action of the solenoid to shift said brush-holder.

The invention also consists in the combination, with a dynamo-electric machine and a main circuit including the same, of a normally-open shunt-circuit from said main circuit, a solenoid included in said shunt-circuit, devices connecting the core of said solenoid with the commutator-brush holder of the dynamo, an electrically-operative device included in the main circuit and adapted to control the shunt-circuit, and a resistance in the main circuit for shunting a portion of the current through said solenoid.

The invention also consists in the combination, with a dynamo-electric machine and a main circuit including the same, of a shunt-circuit from said main circuit, a solenoid included in said shunt-circuit, said solenoid comprising a series of coils of wire, means included in the main circuit for causing a portion of the current to be shunted through the shunt-circuit in one direction or the other, accordingly as the current on the main line exceeds or diminishes from its normal strength, whereby the core of the solenoid will be caused to rise or fall, and means connecting said core with the commutator-brush holder of dynamo; and the invention further consists in certain novel features of construction and combinations and arrangements of parts, as hereinafter set forth, and pointed out in the claims.

Figure 2:
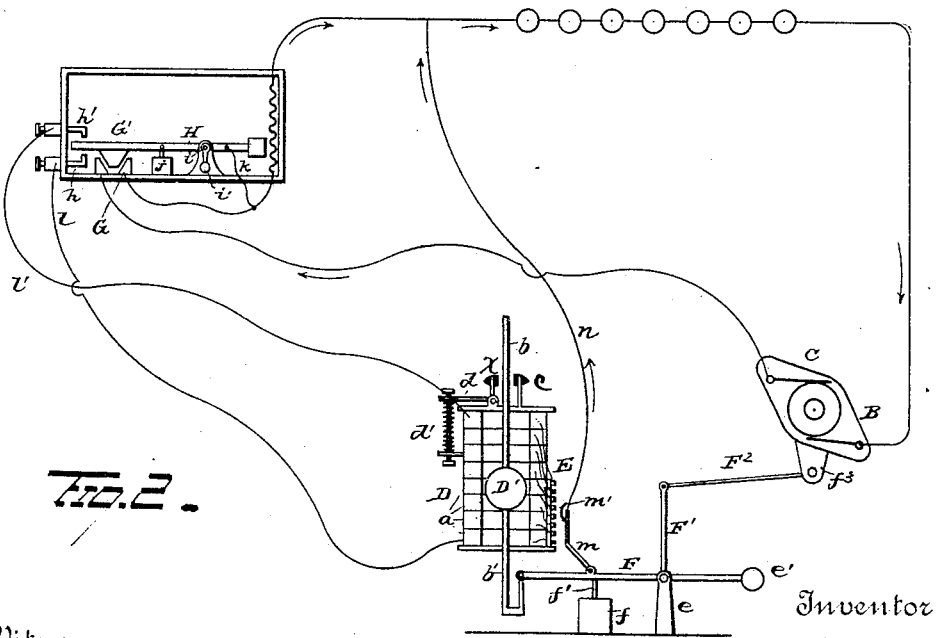

In the accompanying drawings, Figure 1 is a view of a dynamo having my improvements applied thereto. Fig. 2 is a diagrammatical view showing some of the parts in section to illustrate their construction. Fig. 3 is a view of a modification of the controlling mechanism.

A represents a dynamo-electric machine provided with a movable holder B for the commutator-brushes C. Located in proximity to the dynamo, preferably on the same base therewith, is a solenoid D, wound with a series of eight (more or less) coils *a*, one above the other, each coil being connected in series, and the end of each coil being connected to a commutator-bar E, located, preferably, alongside the solenoid D. The core D′ of the solenoid may be made with a curved surface, as shown in Fig. 2, and provided with upwardly and downwardly projecting stems $b\ b'$, which extend beyond the respective ends of said solenoid. The core of the solenoid may be maintained in its normal position within the solenoid by a friction-brake X, which may conveniently consist of a friction sleeve or collar $c$, connected to a bell-crank lever $d$, mounted on the solenoid, said lever $d$ being actuated by a spring $d'$ to cause the friction sleeve or collar $c$ to bind the stem $b$. A lever F is mounted in a suitable bracket $e$ and carries at one end a counterbalance-weight $e'$, the other end of this lever being connected with the lower end of the stem $b'$ of the core $D'$. The movements of the lever F are regulated or steadied when the core of the solenoid operates, as hereinafter explained, by means of a dash-pot $f$, the stem $f'$ of which is connected to said lever. Secured to and projecting from the lever F at the point where said lever is pivotally supported is an arm F', to the upper end of which a rod or link $F^2$ is pivotally connected, the other end of said link or rod being pivotally connected to an ear $f^3$ on the brush-holder B.

Located at any convenient place in a suitable box or casing is my improved controller, which is connected in circuit with the regulator above described in a manner which will be presently explained. In constructing the controller an electro-magnet or solenoid G, preferably having a conical interior, is placed in the casing or box, and in proximity thereto a lever H is mounted in a suitable bracket $g$, said lever carrying at its rear end a counterbalance-weight. The forward arm of the lever H is adapted to project over the electro-magnet or solenoid G and carries a conical armature or core G', to be actuated by the magnet or solenoid. The free extremity of this lever H is adapted to vibrate between two contact-points $h\ h'$, secured to the casing. An arm $i$ projects from the lever H at the point where said lever is pivotally supported, and carries at its free end a weight $i'$, whereby said lever will be easily balanced and kept normally between the contact-points $h\ h'$. To steady the movements of the lever H and prevent a too-sudden movement or jerking thereof, a dash-pot $j$ is provided, having its stem or piston-rod $j'$ connected with said lever at a point between its pivotal support and the armature or core G'. A resistance I of any suitable kind is located in the box or casing A' of the controller, or said resistance may be located at any other desirable point where it will be convenient to include it in the main circuit from the dynamo; but I find it most convenient to locate it in the box or casing A'. The electro-magnet or solenoid G and the resistance I are included in the main circuit of the dynamo, and connecting the armature-lever H with the main line just before it reaches the resistance I, is a short wire $k$. The lower contact-point $h$ is connected by a wire $l$ with the end of the lower coil of the solenoid D, and the contact-point $h'$ is connected by a wire $l'$ with the end of the upper coil of said solenoid. Projecting upwardly from the lever F is an arm $m$, carrying at its upper end a commutator-brush or contact brush or plate $m'$, adapted to make contact with the commutator-bar E, said contact brush or plate being connected with the main circuit by a wire $n$.

With the apparatus thus constructed it will be seen that when the volume or ampèrage of the current exceeds its normal amount— as, for instance, when one or more lamps are cut out of the circuit—the resistance I will cause a portion of the current to be shunted through the lever H, and the excess of current having already caused the magnet G to attract its armature sufficiently to bring the lever H in contact with the point $h$ the current thus shunted, after passing through lever H, will flow thence by the wires $l$ to the lower coils of the solenoid D, out through the commutator-brush or contact-plate $m'$, and finally to the main line by the wire $n$. Now it will be seen that the current thus passing through the lower coils of the solenoid D the core D' of said solenoid will be drawn downwardly, turning the lever F on its fulcrum, and through the arm F' and link $F^2$ shifting the brush-holder and commutator-brushes carried by said holder, thereby decreasing the volume of the current. The volume of the current generated by the dynamo being thus decreased, the magnet G will allow the lever H to move up and be again maintained between the contact-points $h\ h'$, thus opening the shunt-circuit and rendering the solenoid D inactive. When the volume of the current generated by the dynamo decreases below its normal amount, the reverse of the movements above described will occur—that is to say, the strength of the magnet G will be diminished and the forward end of the lever H allowed to rise and make contact with the contact-point $h'$, thereby closing the shunt-circuit through the upper coils of the solenoid D, drawing the core D' up, and, through the medium of the lever F, arm F', and rod or link $F^2$, shift the commutator-brush holder of the dynamo. Should the current rise very high and the lever H be retained in contact with the contact-point $h$ and the commutator brush or plate $m$ were to be fixed, the solenoid D would soon become charged with residual magnetism; but to overcome this defect the brush or contact-plate $m'$ is connected with the lever F and adapted to move with it, so that when the core D' of the solenoid D is drawn down the contact plate or brush $m'$ is also moved down, cutting out the top coils of the solenoid as they are too nearly approached by core D, and vice versa, which variation would be sufficient to bring the commutator-brushes of the dynamo from "full load" to "no load."

By the devices above described means are provided whereby the current generated by a dynamo will be automatically regulated and the regulating devices automatically controlled by the current generated by the dynamo and the output of said dynamo made commensurate with the load upon the machine. The devices are very simple in construction, not easy to get out of order, and are effectual in the performance of their functions.

Instead of arranging the controlling mechanism as above set forth, it may be arranged as shown in Fig. 3, in which the magnet G is made in the ordinary form and the lever H made in the form of a bell-crank lever and adapted to carry an ordinary bar-armature $g'$. Connected to the arm 2 of the lever H is the stem or piston 3 of a dash-pot 4. The free end of the lever H is adapted to operate between the contact-points $h\ h'$, as above described, and is connected by a spring 5 with a bell-crank lever 6, the other arm of said bell-crank lever being adapted to engage and be adjusted by a set-screw 7. Through the medium of the set-screw 7 and bell-crank lever 6 the tension of the spring 5 may be regulated.

Other slight changes might be made in the details of construction without departing from the spirit of my invention. Hence I do not wish to confine myself to the precise details of the construction herein set forth.

Having fully described my invention, what I claim as new, and desire to secure by Letters Patent, is—

1. The combination, with a generator, a main electric circuit, and a shunt-circuit, of a solenoid included in the shunt-circuit, an electro-magnetic device included in the main circuit and adapted to maintain said shunt-circuit normally open and determine the direction of current through the solenoid, said solenoid being composed of a series of coils, devices connecting the core of the solenoid with the generator, and means carried by said devices for automatically controlling the number of coils of the solenoid included in the shunt-circuit, substantially as set forth.

2. In a current-regulator, the combination, with a commutator-brush holder of a dynamo-electric machine, a main electric circuit, and a shunt-circuit, of a solenoid included in the shunt-circuit and composed of a series of coils, an electro-magnetic device included in the main circuit, a pivoted lever, said lever being connected at one end with the core of the solenoid and with the commutator-brush holder, and an arm carried by said lever and adapted to determine the number of coils to be included in the shunt-circuit, corresponding with the varying strengths of the current in said shunt-circuit, substantially as set forth.

3. In a current regulator, the combination, with a generator, of a pivoted lever connected with a commutator-brush holder, means connected with said lever for varying the output of the generator, said means comprising a solenoid composed of a series of coils, a core for said solenoid, connected with said pivoted lever, electro-magnetic devices included in the main line, and contacts therefor, said contacts being included in circuit with the solenoid, substantially as set forth.

4. In a current-regulator, the combination, with the commutator-brush holder of a dynamo-electric machine, of a solenoid composed of a series of coils of wire, means connecting the core of said solenoid with the commutator-brush holder of the dynamo, a commutator-bar to which the coils of the solenoid are connected, and a commutator brush or plate adapted to engage said commutator-bar and electro-magnetic devices for causing the current to enter one or the other end of the solenoid, accordingly as the current in the main line exceeds or recedes from its normal strength, substantially as set forth.

5. The combination, with a movable commutator-brush holder and a solenoid, of stems projecting from said core, means for connecting one of said stems with the movable brush-holder, and a friction-brake connected with the other stem to hold said core in its normal position, substantially as set forth.

In testimony whereof I have signed this specification in the presence of two subscribing witnesses.

ALVARO S. KROTZ.

Witnesses:
R. H. GLEASON,
DEY AYERS.